(12) United States Patent
Osakabe

(10) Patent No.: US 8,749,856 B2
(45) Date of Patent: Jun. 10, 2014

(54) CONFIGURATION FOR MULTIPLE READING UNITS IN AN IMAGE READING DEVICE

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 140 days.

(21) Appl. No.: 13/433,849

(22) Filed: Mar. 29, 2012

(65) Prior Publication Data

US 2013/0003139 A1   Jan. 3, 2013

(30) Foreign Application Priority Data

Jun. 30, 2011   (JP) ................ 2011-146180

(51) Int. Cl.
*H04N 1/04*   (2006.01)
(52) U.S. Cl.
USPC ............ 358/474; 358/497; 358/498; 358/496
(58) Field of Classification Search
USPC .......................... 358/495, 496, 474, 486, 498
See application file for complete search history.

(56) References Cited

U.S. PATENT DOCUMENTS

| | | | |
|---|---|---|---|
| 5,453,852 A | 9/1995 | Morikawa et al. | |
| 5,764,371 A | 6/1998 | Kawashima et al. | |
| 5,986,775 A | 11/1999 | Yoshimizu | |
| 6,101,005 A | 8/2000 | Araki et al. | |
| 6,438,350 B1 | 8/2002 | Hasegawa et al. | |
| 6,917,451 B2 | 7/2005 | Waragai et al. | |
| 7,202,983 B2 | 4/2007 | Yokota et al. | |
| 7,333,247 B2 | 2/2008 | Fujimoto | |
| 7,463,392 B2 | 12/2008 | Yamamoto et al. | |
| 7,515,312 B2 | 4/2009 | Murakami et al. | |
| 7,525,692 B2 * | 4/2009 | Nakaya | ........................ 358/461 |
| 7,656,562 B2 | 2/2010 | Machida | |
| 7,872,784 B2 | 1/2011 | Sato | |
| 2002/0051256 A1 | 5/2002 | Waragai et al. | |

(Continued)

FOREIGN PATENT DOCUMENTS

| | | |
|---|---|---|
| EP | 1292104 A1 | 3/2003 |
| JP | 10126569 A | 5/1998 |

(Continued)

OTHER PUBLICATIONS

Search Report issued in corresponding European Patent Application No. 12161491.1 mailed May 14, 2013.

(Continued)

*Primary Examiner* — Barbara Reinier
(74) *Attorney, Agent, or Firm* — Banner & Witcoff, Ltd.

(57) ABSTRACT

An image reading device includes a holding surface that holds a first document, a conveyor unit that conveys a second document along a conveying path, a first contact surface that contacts a first side of the second document when the conveyor unit conveys the second document, a second contact surface that contacts a second side of the second document when the conveyor unit conveys the second document, and reading units. A first reading unit reads an image on a side of the first document held by the holding surface, and reads an image on the first side of the second document being conveyed by the conveyor unit. A second reading unit is disposed above the second contact surface and reads an image on the second side of the second document. The second reading unit is disposed not to overlap the first reading unit in an up down direction.

20 Claims, 4 Drawing Sheets

(56) References Cited

U.S. PATENT DOCUMENTS

| | | | |
|---|---|---|---|
| 2003/0038989 | A1 | 2/2003 | Yokota et al. |
| 2003/0214683 | A1 | 11/2003 | Fujimoto |
| 2005/0219646 | A1* | 10/2005 | Susaki .......................... 358/474 |
| 2006/0103895 | A1 | 5/2006 | Kohara |
| 2006/0139700 | A1 | 6/2006 | Murakami et al. |
| 2006/0193015 | A1 | 8/2006 | Machida |
| 2006/0227389 | A1 | 10/2006 | Yamamoto et al. |
| 2007/0002401 | A1 | 1/2007 | Park |
| 2008/0130064 | A1 | 6/2008 | Sato |
| 2008/0304116 | A1* | 12/2008 | Lee .............................. 358/498 |
| 2009/0027738 | A1* | 1/2009 | Kim .............................. 358/474 |
| 2009/0122367 | A1 | 5/2009 | Murakami et al. |
| 2010/0149608 | A1 | 6/2010 | Chen et al. |
| 2013/0088761 | A1 | 4/2013 | Kim |

FOREIGN PATENT DOCUMENTS

| | | | |
|---|---|---|---|
| JP | 2850916 | B2 | 1/1999 |
| JP | 11032164 | A | 2/1999 |
| JP | H-11-69044 | A | 3/1999 |
| JP | 2000115452 | A | 4/2000 |
| JP | 2000307796 | A | 11/2000 |
| JP | 2000332953 | A | 11/2000 |
| JP | 2001-203845 | A | 7/2001 |
| JP | 3204144 | B2 | 9/2001 |
| JP | 3253352 | B2 | 2/2002 |
| JP | 2002084404 | A | 3/2002 |
| JP | 3359180 | B2 | 12/2002 |
| JP | 3390170 | | 1/2003 |
| JP | 3379865 | B2 | 2/2003 |
| JP | 3408190 | B2 | 5/2003 |
| JP | 2003315935 | A | 11/2003 |
| JP | 3517607 | B2 | 4/2004 |
| JP | 3530599 | B2 | 5/2004 |
| JP | 3537981 | B2 | 6/2004 |
| JP | 3580951 | B2 | 10/2004 |
| JP | 3599578 | B2 | 12/2004 |
| JP | 3634597 | B2 | 3/2005 |
| JP | 3751874 | B2 | 3/2006 |
| JP | 3771148 | B2 | 4/2006 |
| JP | 2006-217030 | A | 8/2006 |
| JP | 2006-217031 | A | 8/2006 |
| JP | 3839214 | B2 | 11/2006 |
| JP | 3840018 | B2 | 11/2006 |
| JP | 3860026 | B2 | 12/2006 |
| JP | 3883907 | B2 | 2/2007 |
| JP | 3904978 | B2 | 4/2007 |
| JP | 3926537 | B2 | 6/2007 |
| JP | 4047348 | B2 | 2/2008 |
| JP | 4067870 | B2 | 3/2008 |
| JP | 4073032 | B2 | 4/2008 |
| JP | 4112288 | B2 | 7/2008 |
| JP | 4235608 | B2 | 3/2009 |
| JP | 4245162 | B2 | 3/2009 |
| JP | 4327071 | B2 | 9/2009 |
| JP | 4366397 | B2 | 11/2009 |
| JP | 4443440 | B2 | 3/2010 |
| JP | 4447740 | B2 | 4/2010 |

OTHER PUBLICATIONS

Notice of Reasons for Rejection issued in corresponding Japanese Patent Application No. 2011-146180 mailed May 14, 2013.

* cited by examiner

CONFIGURATION FOR MULTIPLE READING UNITS IN AN IMAGE READING DEVICE

CROSS REFERENCE TO RELATED APPLICATION

This application claims priority from Japanese Patent Application No. 2011-146180, filed on Jun. 30, 2011, the entire subject matter of which is incorporated herein by reference.

TECHNICAL FIELD

Aspects of the disclosure relate to an image reading device configured to read images on both sides of a document.

BACKGROUND

A known image reading device includes a flatbed-type image scanner and an automatic document feeder (ADF), which is disposed at a top of the flatbed-type image scanner.

The known image reading device includes two image sensors. When the image reading device is used as an ADF-type image scanner, the image reading device reads images on both sides of a document at substantially the same time.

More specifically, a first image sensor is used when the image reading device is used as the flatbed-type image scanner. When the device is operated as the ADF-type image scanner, the first image sensor is used to read an image on one side of a document while a second image sensor is used to read an image on the other side of the document.

The first image sensor is configured to stay at a position under a contact glass to read an image on the one side of the document that is being conveyed along an upper surface of the contact glass. The second image sensor is fixed at a position above the contact glass and is configured to read an image on the other side of the document that is being conveyed along the upper surface of the contact glass.

BRIEF SUMMARY

However, in the known image reading device, a space above the contact glass may be significant enough in a height direction of the image reading device that a moving document may tend to float in a direction that separates from the contact glass. The floating of the document may cause blurring of the read image.

Such a problem may be prevented or reduced if the space above the contact glass is made to be smaller such that the moving document may not float away and/or apart from the contact glass. However, the space may become too small for the moving document to pass through, thereby causing paper jams.

In particular, if the distance between the document and the first image sensor is adjusted, the distance between the document and the second image sensor may vary due to differences in thickness of documents to be read. Therefore, it may be difficult to adjust these distances to reduce occurrence of blurring in a read image.

The known image reading device including the above-described ADF may tend to be larger in size in its height direction than an image reading device that does not include the ADF. However, there is a desire to reduce the height of the image reading device including the ADF. Nevertheless, the known image reading device includes the two image sensors described above. Therefore, structures or components surrounding the image sensors, and by extension the known image reading device may tend to be greater in height and it may be difficult to reduce the height of the known image reading device.

Therefore, a need has arisen for an image reading device that may overcome one or more of the above and/or other shortcomings Aspects of the disclosure provide for an image reading device that has a reduced height and is configured to read images on both sides of a moving document and obtain clear images read from the both sides of the moving document.

According to at least one illustrative image reading device according to the disclosure, the leading edge of the second document may be guided by the guide when the second document is conveyed from the upstream one of the first and second transparent portions for moving document. Thus, the leading edge of the second document may not contact the end surface of the downstream one of the first and second transparent portions for moving document. Accordingly, the provision of the guide may reduce occurrence of wrinkles on the second document or occurrence of paper jams at the position between the first transparent portion for moving document and the second transparent portion for moving document.

BRIEF DESCRIPTION OF THE DRAWINGS

Illustrative aspects will be described in detail with reference to the following figures in which like elements are labeled with like numbers and in which:

FIG. 2 is a schematic vertical sectional view showing of an image reading device in a first illustrative embodiment according to one or more aspects of the;

DETAILED DESCRIPTION

Figure 1A:
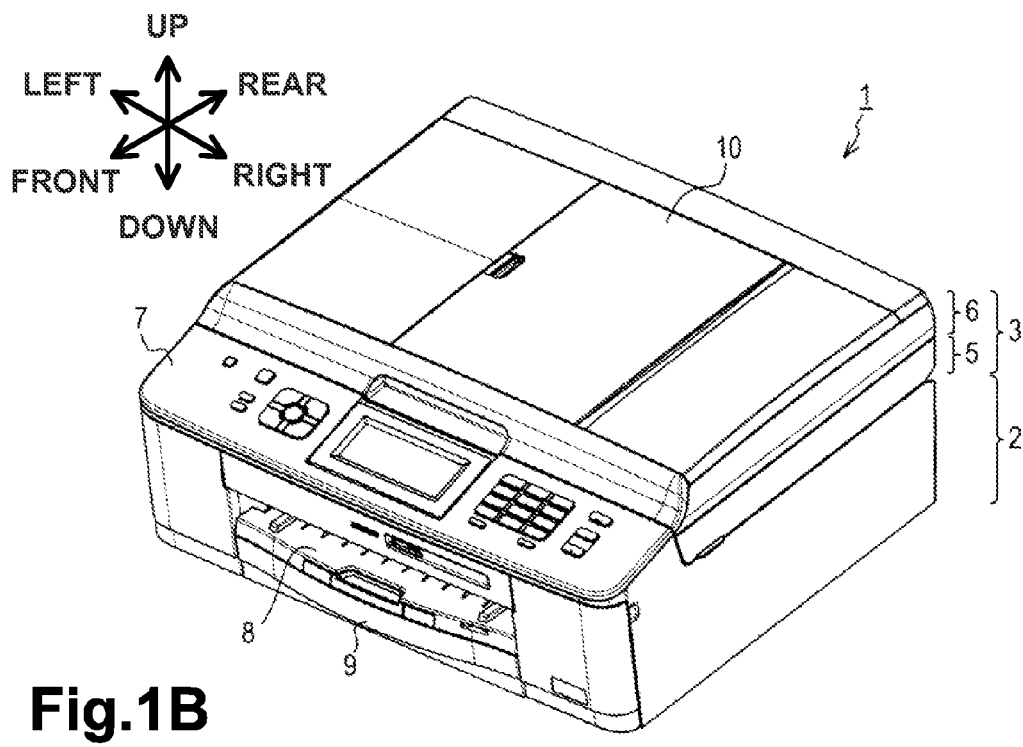
FIGS. 1A and 1B are perspective views showing an appearance of a multifunction peripheral including an image reading device in an illustrative embodiment according to one or more aspects of the disclosure.
Figure 1B:
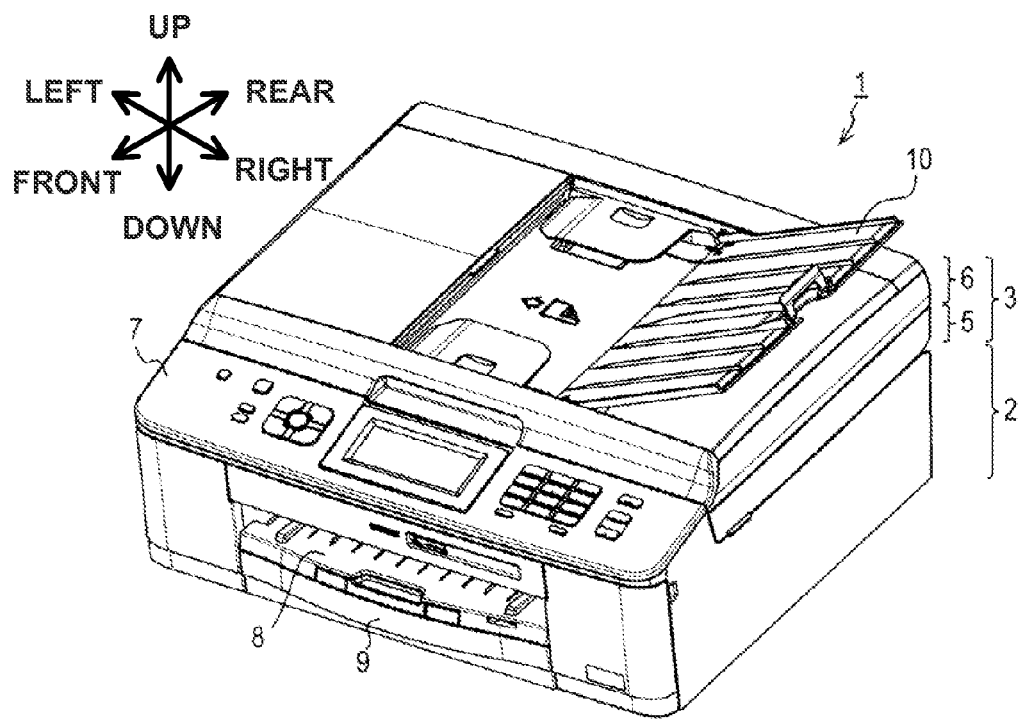

Illustrative embodiments will be described in detail with reference to the accompanying drawings. As shown in FIGS. 1A and 1B, a multifunction peripheral 1 has various functions, e.g., a printing function, a copying function, and a facsimile data transmitting/receiving function, as well as a scanning function, which is a function of an image reading device. Hereinafter, description will be made with reference to directions, e.g., up, down, right, left, front and rear, as shown in the drawing of FIG. 1A in order to explain relative positional relationships among each unit that the multifunction peripheral 1 comprises.

The multifunction peripheral 1 comprises a printer unit 2 and a scanner unit 3. The scanner unit 3 is disposed above the printer unit 2. The scanner unit 3 comprises an automatic document feeder (ADF) in a cover portion of a flatbed-type image scanner. The scanner unit 3 further comprises a scanner portion 5, which is a lower part thereof, and an ADF portion 6, which is an upper part thereof.

The printer unit 2 comprises a control panel 7 that is disposed at an upper front part of the printer unit 2. The control panel 7 is configured to be operated by a user. The printer unit 2 further comprises a sheet feed cassette 9 that is configured to be attachable to and detachable from a lower part of the printer unit 2. The sheet feed cassette 9 is configured to accommodate one or more recording media on which printing is to be performed. The printer unit 2 has a discharge port 8 above the sheet feed cassette 9. A recording medium on which printing is performed is discharged from the discharge port 8.

The scanner unit 3 is configured to pivot about an axis, which extends in a right-left direction near a rear edge of the scanner unit 3, with respect to the printer unit 2. In accordance with the pivoting of the scanner unit 3, the scanner unit 3 is configured to be movable between a position where the scanner unit 3 covers an upper opening of the printer unit 2 and a position where the scanner unit 3 uncovers the upper opening of the printer unit 2.

The ADF portion 6 is configured to pivot about an axis, which extends in the right-left direction near a rear edge of the ADF portion 6, with respect to the scanner portion 5. In accordance with the pivoting of the ADF portion 6, the ADF portion 6 is configured to be movable between a position where the ADF portion 6 covers a document holding surface defined by an upper surface of the scanner portion 5 and a position where the ADF portion 6 uncovers the document holding surface.

An openable cover portion 10 is disposed at a top of the ADF portion 6. The cover portion 10 serves as a cover that covers an upper opening of the ADF portion 6 when closed as shown in FIG. 1A. The cover portion 10 also serves as a tray that holds one or more documents, which are to be conveyed by the ADF portion 6 for scanning, and also receives one or more discharged documents, which were conveyed by the ADF portion 6, when opened as shown in FIG. 1B.

Figure 2:
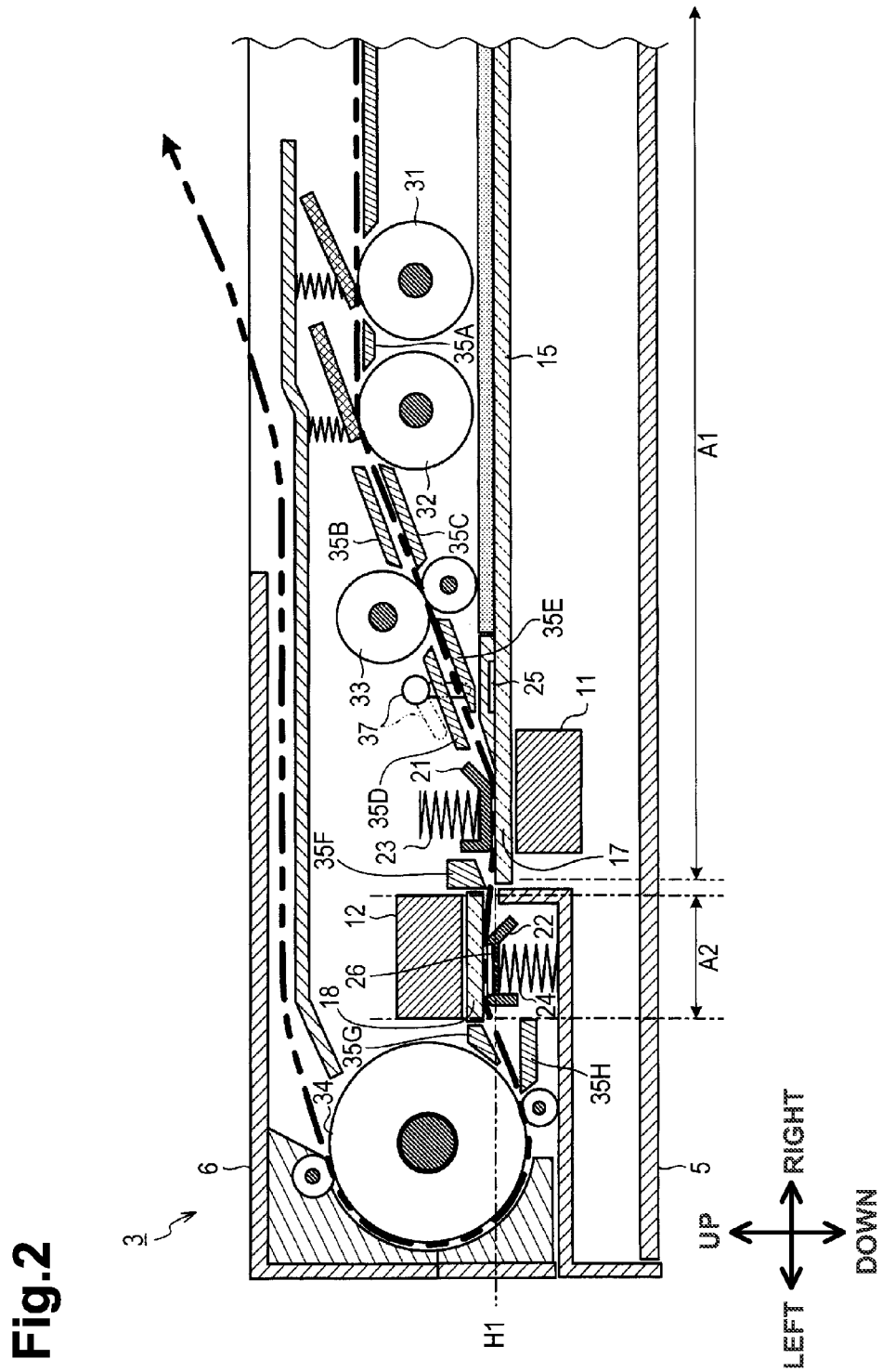

As shown in FIG. 2, the scanner unit 3 comprises a first reading unit, for example, a first image sensor 11 and a second reading unit, for example, a second image sensor 12 in this illustrative embodiment. The first and second image sensors 11 and 12 may both be contact image sensors in this illustrative embodiment.

The first image sensor 11 is disposed in the scanner portion 5 and is configured to reciprocate in the right-left direction by a motor (not shown). The second image sensor 12 is fixed in the ADF portion 6.

In the scanner portion 5, a transparent portion for stationary document 15 and a first transparent portion for moving document 17 are disposed above the reciprocation path of the first image sensor 11. In the ADF portion 6, a second transparent portion for moving document 18 is disposed under the second image sensor 12.

The transparent portion for stationary document 15 and the first transparent portion for moving document 17 define an upper surface of the scanner portion 5. In this illustrative embodiment, a single glass plate constitutes the transparent portion for stationary document 15 and the first transparent portion for moving document 17. Another glass plate is used for the second transparent portion for moving document 18.

Separate glass plates may be used for the transparent portion for stationary document 15 and the first transparent portion for moving document 17. Material other than glass may be used for the transparent portion for stationary document 15 and the first and second transparent portions for moving document 17, 18 if the material is transparent and the first and second image sensors 11, 12 can read a document therethrough.

In the AFD portion 6, a first document pressing member 21 is disposed above the first transparent portion for moving document 17. In the scanner portion 5, a second document pressing member 22 is disposed under the second transparent portion for moving document 18.

The first document pressing member 21 is urged downward by a compression spring 23 to lightly press the upper surface of the first transparent portion for moving document 17. An upper end of the compression spring 23 is supported by a frame (not shown) in the ADF portion 6 and a lower end of the compression spring 23 is supported by an upper surface (a surface opposite to a surface facing the first transparent portion for moving document 17) of the first document pressing member 21.

The second document pressing member 22 is urged upward by a compression spring 24 to lightly press a lower surface of the second transparent portion for moving document 18. An upper end of the compression spring 24 is supported by a lower surface (a surface opposite to a surface facing the second transparent portion for moving document 18) of the second document pressing member 22 and a lower end of the compression sprint 24 is supported by the frame in the ADF portion 6.

A first white color reference portion 25 is disposed between the transparent portion for stationary document 15 and the first transparent portion for moving document 17 in the right-left direction in the scanner portion 5. The first white color reference portion 25 is in contact with the upper surface of the glass plate constituting the transparent portion for stationary document 15 and the first transparent portion for moving document 17. In shading correction of the first image sensor 11, the first image sensor 11 reads the first white color reference portion 25 through the glass plate to correct white balance of the read image.

A second white color reference portion 26 is disposed at the upper surface of the second document pressing member 22. The second white color reference portion 26 is in contact with the lower surface of the glass plate of the second transparent portion for moving document 18. The second white color reference portion 26 is disposed to fit in a document pressing surface of the second document pressing member 22. In shading correction of the second image sensor 12, the second image sensor 12 reads the second white color reference portion 26 through the glass plate to correct white balance of the read image.

The ADF portion 6 comprises a plurality of rollers, e.g., a supply roller 31, a separating roller 32, a relay roller 33, and a reverse roller 34, which are disposed along a document conveying path (indicated by a double-dotted and dashed line in FIG. 2). Guides 35A-35H are disposed between the rollers 31-34 to guide a moving document in a direction along the document conveying path. The reverse roller 34 is configured to convey a document and reverse a conveying direction of the document such that the document is substantially U-turned.

A document sensor 37 is disposed downstream of the relay roller 33 and upstream of the first document pressing member 21 in the conveying path. The document sensor 37 is configured to be movable between a non-detecting position and a detecting position. When a leading edge of a document reaches the document sensor 37, the document sensor 37 contacts the document. Thus, the document sensor 37 moves from the non-detecting position to the detecting position and is turned from an off state to an on state. When a trailing edge of the document passes the document sensor 37, the document sensor 37 no longer detects the document. Thus, the document sensor 38 moves from the detecting position to the non-detecting position and is turned from the on state to the off state. Therefore, the positions of the leading and trailing edges of the document can be detected by observing the switching of the state of the document sensor 37 between the on state and the off state.

When the scanner unit 3 is used as the ADF-type scanner in the multifunction peripheral 1 configured as described above, one or more documents are placed in the ADF portion 6. In this state, a scan instruction is provided to the multifunction peripheral 1 by an input such as input received by the control panel 7 or by remote control from a personal computer (not shown). A user can arbitrarily specify either of a one-sided scanning or a double-sided scanning when providing the scan instruction.

When the multifunction peripheral 1 receives the scan instruction, the multifunction peripheral 1 initializes each unit or portion therein. The multifunction peripheral 1 performs shading correction of the first and second image sensors 11, 12 as part of the initialization process. At that time, the first image sensor 11 moves to a position under the first white color reference portion 25 in the right-left direction and performs the shading correction by reading the first white color reference portion 25 at that position. Then, the first image sensor 11 moves to a position under the first document pressing member 21 in the right-left direction and comes to a standstill at that position. Because the second image sensor 12 is fixed facing the second white color reference portion 26, the second image sensor performs the shading correction by reading the second white color reference portion 26 at that position.

After the initialization process, the plurality of rollers in the ADF portion 6 starts rotating. At that time, one or more documents supplied from the upstream end of the conveying direction by the supply roller 31 are separated one by one by the separating roller 32 and each separated document is conveyed downstream in the conveying direction. The document is then further conveyed downstream by the relay roller 33 and passes between the first transparent portion for moving document 17 and the first document pressing member 21.

The front-rear direction of the multifunction peripheral 1 corresponds to a main-scanning direction. The conveying direction corresponds to a sub-scanning direction. When the document reaches the position facing the first image sensor 11, the first image sensor 11 reads an image on a first side of the document moving in the sub-scanning direction by repeatedly reading pixels arranged in the main-scanning direction on the document. The timing at which the document reaches the position facing the first image sensor 11 equals a time elapsed since the document is conveyed by a predetermined distance from a timing at which the document sensor 37 detected the leading edge of the document.

The document passed between the first transparent portion for moving document 17 and the first document pressing member 22 then passes between the second transparent portion for moving document 18 and the second document pressing member 22. When the document reaches the position facing the second image sensor 12, the second image sensor 12 reads an image on a second side of the document by repeatedly reading pixels arranged in the main-scanning direction on the document. The timing at which the document reaches the position facing the second image sensor 12 equals a time elapsed since the document is conveyed by a predetermined distance from a timing at which the document sensor 37 detected the leading edge of the document.

The document passed between the second transparent portion for moving document 18 and the second document pressing member 22 then reaches the reverse roller 34. The document is substantially U-turned along a circumference of the reverse roller 34 and then is discharged onto the upper surface of the scanner unit 3.

When the scanner unit 3 is operated as the flatbed-type scanner in the multifunction peripheral 1, the ADF portion 6 is pivoted to open and a document is placed on the transparent portion for stationary document 15. That is, the upper surface of the transparent portion for stationary document 15 serves as the document holding surface. In this condition, a scan instruction is provided to the multifunction peripheral 1 by an input such as an input received by the control panel 7 or by remote control from the personal computer (not shown).

When the multifunction peripheral 1 receives the scan instruction, the multifunction peripheral 1 performs the initialization process to initialize each unit or portion. The multifunction peripheral 1 performs shading correction of the first image sensor 11 as part of the initialization process. The description of the shading correction of the first image sensor 11 will be omitted because it has already been described above.

After the initialization process, the first image sensor 11 reads an image on a first or second side of the stationary document by repeatedly reading pixels arranged in the main-scanning direction on the document while moving in the sub-scanning direction.

In the multifunction peripheral 1 configured as described above, when a document passes through the position at which the document makes contact with the first transparent portion for moving document 17, the first document pressing member 21 presses the document toward the first transparent portion for moving document 17, and when the document passes through the position at which the document makes contact with the second transparent portion for moving document 18, the second document pressing member 22 presses the document toward the second transparent portion for moving document 18.

This configuration may reduce a tendency of a moving document from floating in the direction that separates from the first and second transparent portions for moving document 17, 18. Accordingly, the scanner unit 3 may clearly read images on both sides of the document. In addition, because the first document pressing member 21 and the second document pressing member 22 prevent or reduce the floating of the moving document, the document conveying path may not need to be narrowed significantly at the positions where the moving document makes contact with the first and second transparent portions for moving document 17, 18. Therefore, occurrence of paper jams may be reduced.

The first transparent portion for moving document 17 and the second transparent portion for moving document 18 are disposed on opposite sides of the conveying path. A first side of a moving document makes contact with the first transparent portion for moving document 17, and a second side of the moving document makes contact with the second transparent portion for moving document 18. With this configuration, a distance between a read-target surface of the moving document and the first image sensor 11 and a distance between another read-target surface of the moving document and the second image sensor 12 may be adjusted independent of the thicknesses of documents to be conveyed.

As shown in FIG. 2, an area A1, in which the first image sensor 11 and the first document pressing member 21 are disposed, does not overlap an area A2, in which the second image sensor 12 and the second document pressing member 22 are disposed, when viewed from a direction perpendicular to the document holding surface of the transparent portion for stationary document 15. In addition, the second document pressing member 22 is disposed such that a part of the second document pressing member 22 is disposed lower than a reference plane H1, which extends on substantially the same plane as the document holding surface of the transparent portion for stationary document 15, in the height direction.

With this configuration, the second document pressing member 22 may be disposed at a lower position in the height direction as compared with a device in which an equivalent to the second document pressing member 22 is disposed to overlap an equivalent to the first image sensor 11 and an equivalent to the first document pressing member 21 (i.e., the area A1 and the area A2 of FIG. 2 overlap each other in the right-left direction) when viewed from the direction perpendicular to the document holding surface.

Therefore, the second transparent portion for moving document 18 and the second image sensor 12 may be also disposed at lower positions correspondingly. In addition, the height of the scanner unit 3 may be reduced.

In the multifunction peripheral 1, the second white color reference portion 26 is disposed at the document pressing surface of the second document pressing member 22. Therefore, the multifunction peripheral 1 may need not adopt a complicated configuration in which, for example, a white color reference portion is provided separately from the second document pressing member 22, and can correct the white balance by reading the second white color reference portion 26 by the second image sensor 12. Therefore, the configuration surrounding the second image sensor 12 and the second document pressing member 22 may be simplified. The height of the configuration surrounding the second image sensor 12 and the second document pressing member 22 may be limited correspondingly, which may contribute to the reduction of the height of the multifunction peripheral 1.

The second white color reference portion 26 is disposed on the document pressing surface of the second document pressing member 22. Therefore, the second image sensor 12 may correct the white balance by reading the second white color reference portion 26 on the same condition as the document that is read by the second image sensor 12 with the second transparent portion for moving document 18 interposed therebetween. Accordingly, the white balance may be corrected with higher precision than a configuration in which the white color reference is read at a position different from the document reading position.

In the multifunction peripheral 1, the guide 35F is disposed between the first transparent portion for moving document 17, which is disposed upstream in the conveying direction, and the second transparent portion for moving document 18, which is disposed downstream in the conveying direction, to guide a leading edge of a document, which is conveyed from the first transparent portion for moving document 17 to the second transparent portion for moving document 18. With the provision of the guide 35F, the leading edge of the document is prevented from contacting a right end surface of the second transparent portion for moving document 18. Therefore, the provision of the guide 35F may prevent or reduce occurrence of wrinkles on a moving document or occurrence of paper jams at the position between the first transparent portion for moving document 17 and the second transparent portion for moving document 18.

Hereinafter, second and third illustrative embodiments will be described with reference to FIGS. 3 and 4. An explanation will be given mainly for the parts different from the first illustrative embodiment, and an explanation will be omitted for the common parts by assigning the same reference numerals thereto.

Figure 3:
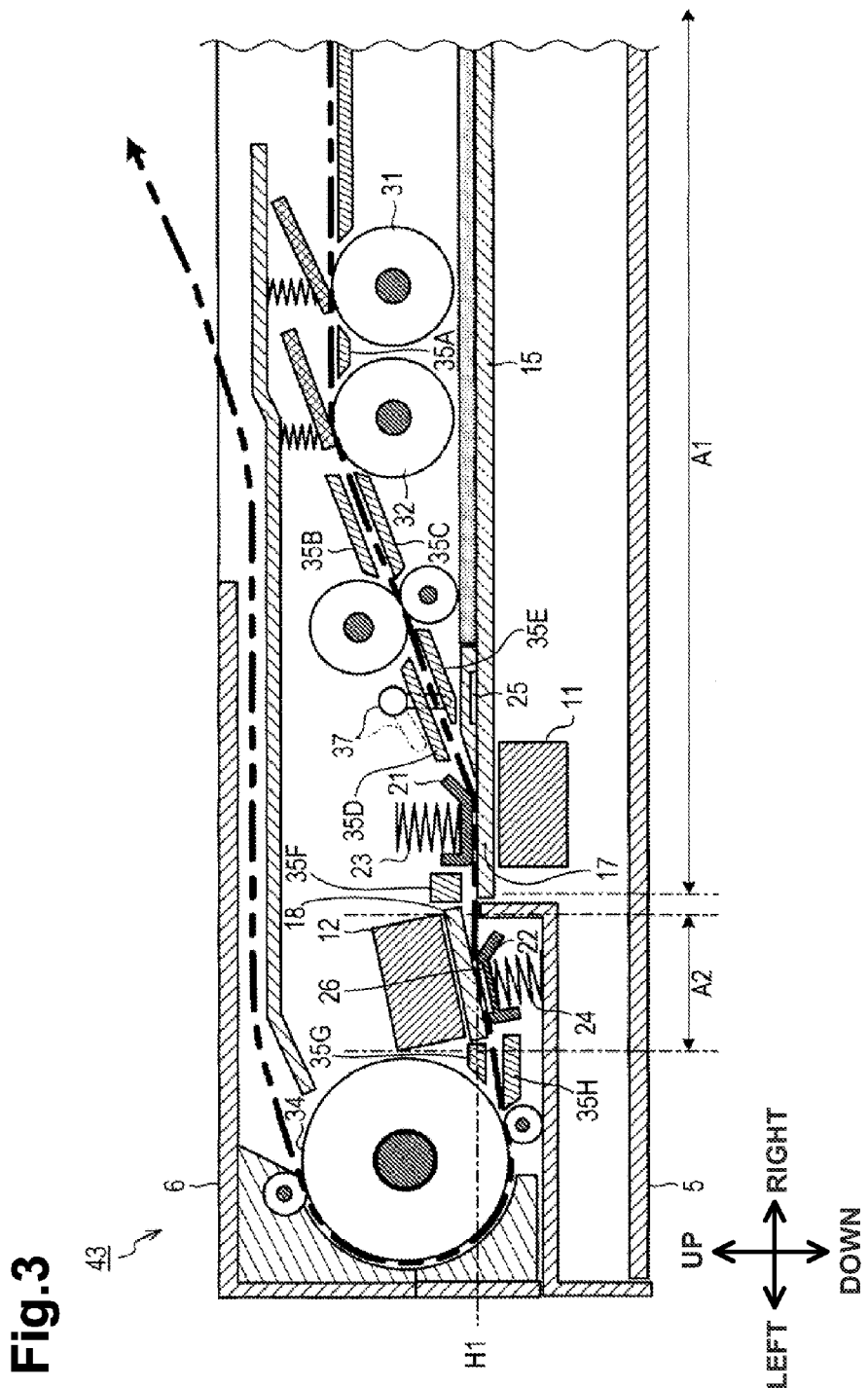
FIG. 3 is a schematic vertical sectional view showing of an image reading device in a second illustrative embodiment according to one or more aspects of the disclosure.
Figure 4:
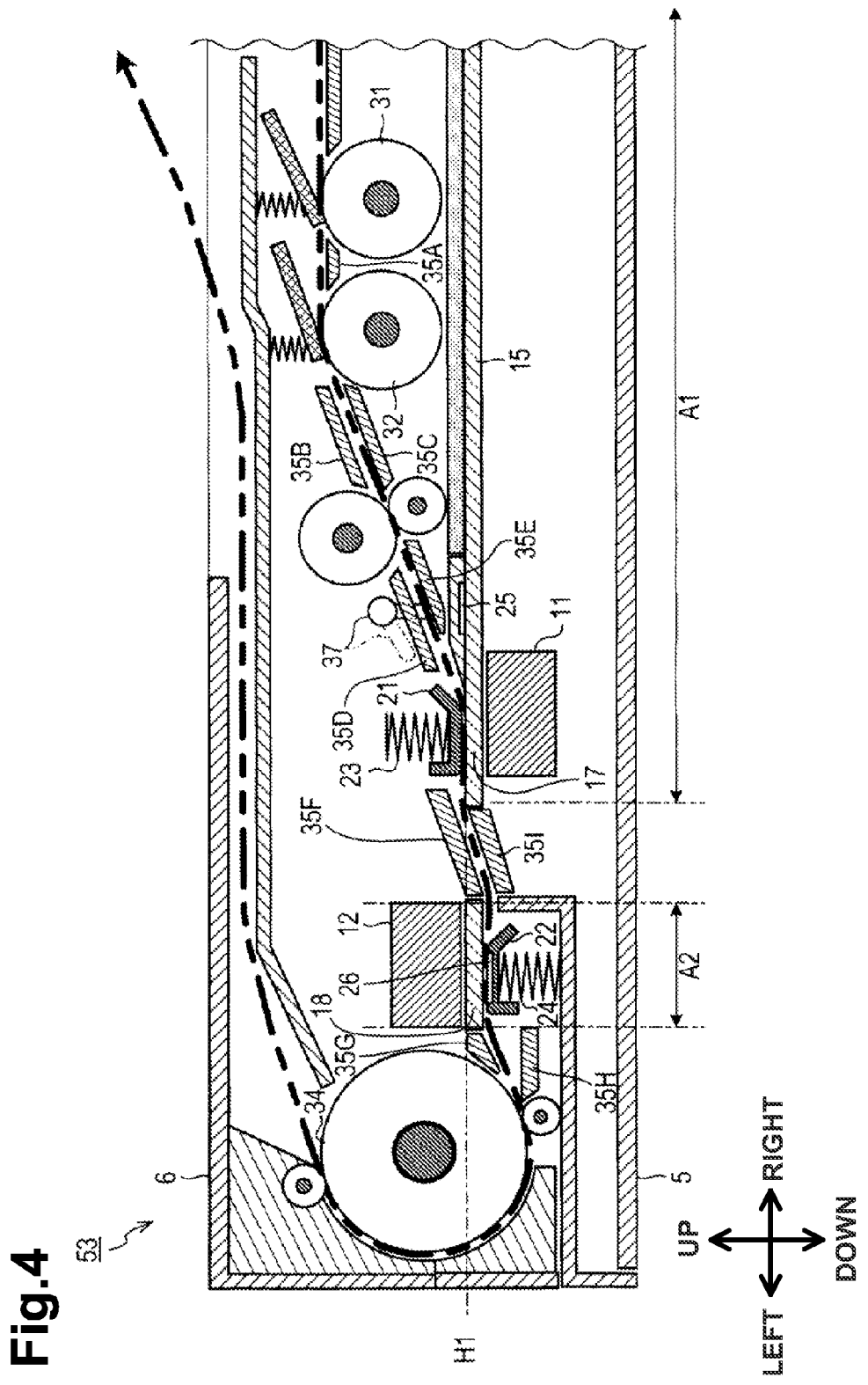
FIG. 4 is a schematic vertical sectional view showing of an image reading device in a third illustrative embodiment according to one or more aspects of the invention

According to the second illustrative embodiment shown in FIG. 3, in a scanner unit 43, the second image sensor 12, the second transparent portion for moving document 18, and the second document pressing member 22 are inclined with respect to a horizontal plane.

The document contact surface of the second transparent portion for moving document 18 extends on a plane and is inclined with respect to the reference plane H1 and intersects the reference plane H1. Therefore, when a document is conveyed downstream from the position where the document makes contact with the first transparent portion for moving document 17 in the conveying path along the reference plane H1, a leading edge of the document makes contact with the document contact surface of the second transparent portion for moving document 18.

The scanner unit 43 configured as described above also provides the same effects as those provided by the scanner unit 3 according to the first illustrative embodiment. In addition, the leading edge of the document makes contact with the inclined document contact surface of the second transparent portion for moving document 18.

Accordingly, in the second illustrative embodiment, a leading edge of a moving document can be guided to the conveying path along the document contact surface of the second transparent portion for moving document 18 with a guide in place of the second document pressing member 22, in contrast to the first illustrative embodiment in which the document contact surface of the second transparent portion for moving document 18 extends substantially parallel to the reference plane H1.

The second transparent portion for moving document 18 is inclined toward the circumference of the reverse roller 34, which is disposed downstream of the second transparent portion for moving document 18 in the conveying direction. With this configuration, a leading edge of a moving document may be smoothly guided to a curved part (e.g., substantially U-shaped part) of the conveying path.

The third illustrative embodiment of the invention will be described with reference to FIG. 4. A distance between the first image sensor 11 and the second image sensor 12 disposed in a scanner unit 53 in the right-left direction is greater than a distance between the first image sensor 11 and the second image sensor 12 disposed in the scanner unit 3 in the right-left direction according to the first illustrative embodiment. The second image sensor 12, the second transparent portion for moving document 18, and the second document pressing member 22 are disposed lower than those of the first illustrative embodiment in the height direction.

Therefore, guides 35F, 351 are disposed in a space between the first transparent portion for moving document 17 and the second transparent portion for moving document 18 to guide a leading edge of a moving document to the lower-surface side of the second transparent portion for moving document 18.

The scanner unit 53 configured as described above also provides the same effects as those provided by the scanner unit 3 according to the first illustrative embodiment. In addition, a leading edge of a moving document is appropriately guided to the lower surface of the second transparent portion for moving document 18 although the lower surface of the second transparent portion for moving document 18 is located lower than a third reference plane (not illustrated) that extends on the same plane as the upper surface of the first transparent portion for moving document 17. Thus, the leading edge of the moving document may not contact the right end surface of the second transparent portion for moving document 18. Accordingly, the provision of the guides 35F, 351 prevents or reduces occurrence of wrinkles on the moving document or occurrence of paper jams at the position between the first transparent portion for moving document 17 and the second transparent portion for moving document 18.

According to the third illustrative embodiment, the second image sensor 12, the second transparent portion for moving document 18, and the second document pressing member 22 are disposed lower than those of the first illustrative embodiment in the height direction. With this configuration, the height of the scanner unit 53 may be further reduced at the portion where the second image sensor 12, the second transparent portion for moving document 18, and the second document pressing member 22 are disposed. Thus, the height of the multifunction peripheral 1 may be reduced.

While the disclosure has been described in detail with reference to the specific illustrative embodiments thereof, it would be apparent to those skilled in the art that various changes, arrangements and modifications may be applied therein without departing from the spirit and scope of the disclosure.

In the above-described illustrative embodiments, the conveying direction along the reverse roller 34 is defined such that a document is conveyed from below upward in the conveying path along the reverse roller 34. Nevertheless, in other illustrative embodiments, for example, the conveying direction along the reverse roller 34 may be reversed such that a document is conveyed from above downward in the conveying path along the reverse roller 34.

In this case, a document is conveyed from the second transparent portion for moving document 18 to the first transparent portion for moving document 17. When the document contact surface of the second transparent portion for moving document 18 is inclined as that of the second illustrative embodiment, the upper surface of the first transparent portion for moving document 18 may be inclined with respect to a conveying direction of a document that is fed from the lower surface of the second transparent portion for moving document 18.

In the above-described illustrative embodiments, the features of the disclosure have been described while taking the multifunction peripheral 1 as an example. Nevertheless, in other illustrative embodiments, for example, an image reading device may not have any functions other than the scanning function. Aspects of the disclosure may be adopted in, for example, a single-function image reading device having a scanning function.

What is claimed is:

1. An image reading device comprising:
   a document holding surface configured to hold a first document for flatbed scanning;
   a document conveyor unit configured to convey a second document along a conveying path for ADF-type image scanning;
   a first document contact surface configured to come into contact with a first side of the second document when the document conveyor unit conveys the second document;
   a first document pressing member disposed above the first document contact surface and configured to press the second document toward the first document contact surface when the document conveyor unit conveys the second document;
   a second document contact surface configured to come into contact with a second side of the second document when the document conveyor unit conveys the second document;
   a second document pressing member disposed below the second document contact surface and configured to press the second document toward the second document contact surface when the document conveyor unit conveys the second document;
   a first reading unit configured to:
   read an image on a side of the first document held by the document holding surface while traversing below the document holding surface; and
   read an image on the first side of the second document being conveyed by the document conveyor unit while the first reading unit is stationary below the first document contact surface; and
   a second reading unit disposed above the second document contact surface and configured to read an image on the second side of the second document being conveyed by the document conveyor unit,
   wherein the second reading unit and the second document pressing member are disposed not to overlap the first reading unit and the first document pressing member when viewed from a direction perpendicular to the document holding surface, and
   wherein a downstream one of the first and second document contact surfaces in the conveying path intersects or is disposed below a reference plane, the reference plane extending along the same plane as an upstream one of the first and second document contact surfaces and overlapping the downstream one of the first and second document contact surfaces in a direction orthogonal to the downstream one of the first and second document contact surfaces.

2. The image reading device according to claim 1, wherein a white color reference portion is disposed at a document pressing surface of the second document pressing member and read by the second reading unit as a white color reference.

3. The image reading device according to claim 1, further comprising a guide disposed between the first document contact surface and the second document contact surface, the guide configured to guide a leading edge of the second document being conveyed to the downstream one of the first and second document contact surfaces while preventing the leading edge of the second document from contacting an end surface of the downstream one of the first and second document contact surfaces.

4. The image reading device according to claim 1, wherein the first and second reading units include contact image sensors.

5. The image reading device according to claim 1, wherein at least a part of the second document pressing member is disposed lower than the document holding surface in a height direction of the image reading device that is perpendicular to a direction in which the document holding surface extends.

6. An image reading device comprising:
   a document holding surface configured to hold a first document for flatbed scanning;
   a document conveyor unit configured to convey a second document along a conveying path for ADF-type image scanning;
   a first document contact surface configured to come into contact with a first side of the second document when the document conveyor unit conveys the second document;
   a first document pressing member disposed above the first document contact surface and configured to press the second document toward the first document contact surface when the document conveyor unit conveys the second document;
   a second document contact surface configured to come into contact with a second side of the second document when the document conveyor unit conveys the second document;
   a second document pressing member disposed below the second document contact surface and configured to press the second document toward the second document contact surface when the document conveyor unit conveys the second document a first reading unit configured to:
　read an image on a side of the first document held by the document holding surface while traversing below the document holding surface; and
　read an image on the first side of the second document being conveyed by the document conveyor unit while the first reading unit is stationary below the first document contact surface; and a second reading unit disposed above the second document contact surface and configured to read an image on the second side of the second document being conveyed by the document conveyor unit, wherein the second reading unit and the second document pressing member are disposed not to overlap the first reading unit and the first document pressing member when viewed from a direction perpendicular to the document holding surface, wherein a downstream one of the first and second document contact surfaces in the conveying path is inclined with respect to a reference plane and intersects the reference plane, wherein a leading edge of the second document makes contact with the downstream one of the first and second document contact surfaces when the second document is conveyed downstream along the reference plane in the conveying path from a position where the second document is in contact with an upstream one of the first and second document contact surfaces, and wherein the reference plane extends along the same plane as an upstream one of the first and second document contact surfaces.

7. An image reading device comprising:
　a document holding surface configured to hold a first document for flatbed scanning;
　a document conveyor unit configured to convey a second document along a conveying path for ADF-type image scanning;
　a first document contact surface configured to come into contact with a first side of the second document when the document conveyor unit conveys the second document;
　a first document pressing member disposed above the first document contact surface and configured to press the second document toward the first document contact surface when the document conveyor unit conveys the second document;
　a second document contact surface configured to come into contact with a second side of the second document when the document conveyor unit conveys the second document;
　a second document pressing member disposed below the second document contact surface and configured to press the second document toward the second document contact surface when the document conveyor unit conveys the second document;
　a first reading unit configured to:
　　read an image on a side of the first document held by the document holding surface while traversing below the document holding surface; and
　　read an image on the first side of the second document being conveyed by the document conveyor unit while the first reading unit is stationary below the first document contact surface; and
　a second reading unit disposed above the second document contact surface and configured to read an image on the second side of the second document being conveyed by the document conveyor unit, wherein no line perpendicular to the document holding surface intersects both the first and second reading units and no line perpendicular to the document holding surface intersects both the first and second document pressing members, and wherein a downstream one of the first and second document contact surfaces in the conveying path intersects or is disposed below a reference plane, the reference plane extending along the same plane as an upstream one of the first and second document contact surfaces and overlapping the downstream one of the first and second document contact surfaces in a direction orthogonal to the downstream one of the first and second document contact surfaces.

8. The image reading device according to claim 7, wherein the first and second reading units include contact image sensors.

9. The image reading device according to claim 7, wherein a white color reference portion is disposed at a document pressing surface of the second document pressing member and read by the second reading unit as a white color reference.

10. The image reading device according to claim 7, further comprising a guide disposed between the first document contact surface and the second document contact surface, the guide configured to guide a leading edge of the second document being conveyed to the downstream one of the first and second document contact surfaces while preventing the leading edge of the second document from contacting an end surface of the downstream one of the first and second document contact surfaces.

11. An image reading device comprising:
　a document holding surface configured to hold a first document for flatbed scanning;
　a document conveyor unit configured to convey a second document along a conveying path for ADF-type image scanning;
　a first document contact surface configured to come into contact with a first side of the second document when the document conveyor unit conveys the second document;
　a first document pressing member disposed above the first document contact surface and configured to press the second document toward the first document contact surface when the document conveyor unit conveys the second document;
　a second document contact surface configured to come into contact with a second side of the second document when the document conveyor unit conveys the second document;
　a second document pressing member disposed below the second document contact surface and configured to press the second document toward the second document contact surface when the document conveyor unit conveys the second document;
　a first reading unit configured to:
　　read an image on a side of the first document held by the document holding surface while traversing below the document holding surface; and
　　read an image on the first side of the second document being conveyed by the document conveyor unit while the first reading unit is stationary below the first document contact surface; and
　a second reading unit disposed above the second document contact surface and configured to read an image on the second side of the second document being conveyed by the document conveyor unit, wherein no line perpendicular to the document holding surface intersects both the first and second reading units and no line perpendicular to the document holding surface intersects both the first and second document pressing members, wherein a downstream one of the first and second document contact surfaces in the conveying path is inclined with respect to a reference plane and intersects the reference plane, wherein a leading edge of the second document makes contact with the downstream one of the first and second document contact surfaces when the second document is conveyed downstream along the reference plane in the conveying path from a position where the second document is in contact with an upstream one of the first and second document contact surfaces, and wherein the reference plane extends along the same plane as an upstream one of the first and second document contact surfaces.

12. An image reading device comprising:

a document holding surface configured to hold a first document for flatbed scanning;

a document conveyor unit configured to convey a second document along a conveying path for ADF-type image scanning, the document conveyor unit including a reverse roller disposed along the conveying path;

a first document contact surface configured to come into contact with a first side of the second document when the document conveyor unit conveys the second document;

a second document contact surface configured to come into contact with a second side of the second document when the document conveyor unit conveys the second document;

a first reading unit configured to:
  read an image on a side of the first document held by the document holding surface while traversing below the document holding surface; and
  read an image on the first side of the second document being conveyed by the document conveyor unit while the first reading unit is stationary below the first document contact surface; and a second reading unit disposed above the second document contact surface and configured to read an image on the second side of the second document being conveyed by the document conveyor unit, wherein no line parallel to a line connecting a top most point of the reverse roller and a bottom most point of the reverse roller intersects both the first and second reading units, and wherein no line including the top most point of the reverse roller and the bottom most point of the reverse roller intersects the second reading unit, and wherein a downstream one of the first and second document contact surfaces in the conveying path intersects or is disposed below a reference plane, the reference plane extending along the same plane as an upstream one of the first and second document contact surfaces and overlapping the downstream one of the first and second document contact surfaces in a direction orthogonal to the downstream one of the first and second document contact surfaces.

13. The image reading device according to claim 12, wherein the first and second reading units include contact image sensors.

14. The image reading device according to claim 12 further comprising a first document pressing member disposed below the second document contact surface and configured to press the second document toward the second document contact surface when the document conveyor unit conveys the second document.

15. The image reading device according to claim 14, wherein no line including the top most point of the reverse roller and the bottom most point of the reverse roller intersects the first document pressing member.

16. The image reading device according to claim 14, further comprising a second document pressing member disposed above the first document contact surface and configured to press the second document toward the first document contact surface when the document conveyor unit conveys the second document.

17. The image reading device according to claim 14, wherein no line parallel to the line connecting the top most point of the reverse roller and the bottom most point of the reverse roller intersects both the first and second document pressing members.

18. The image reading device according to claim 12, wherein a white color reference portion is disposed at a document pressing surface of the second document pressing member and read by the second reading unit as a white color reference.

19. The image reading device according to claim 12, further comprising a guide disposed between the first document contact surface and the second document contact surface, the guide configured to guide a leading edge of the second document being conveyed to the downstream one of the first and second document contact surfaces while preventing the leading edge of the second document from contacting an end surface of the downstream one of the first and second document contact surfaces.

20. An image reading device comprising:

a document holding surface configured to hold a first document for flatbed scanning;

a document conveyor unit configured to convey a second document along a conveying path for ADF-type image scanning, the document conveyor unit including a reverse roller disposed along the conveying path;

a first document contact surface configured to come into contact with a first side of the second document when the document conveyor unit conveys the second document;

a second document contact surface configured to come into contact with a second side of the second document when the document conveyor unit conveys the second document;

a first reading unit configured to:
  read an image on a side of the first document held by the document holding surface while traversing below the document holding surface; and
  read an image on the first side of the second document being conveyed by the document conveyor unit while the first reading unit is stationary below the first document contact surface; and a second reading unit disposed above the second document contact surface and configured to read an image on the second side of the second document being conveyed by the document conveyor unit, wherein no line parallel to a line connecting a top most point of the reverse roller and a bottom most point of the reverse roller intersects both the first and second reading units, wherein no line including the top most point of the reverse roller and the bottom most point of the reverse roller intersects the second reading unit, wherein a downstream one of the first and second document contact surfaces in the conveying path is inclined with respect to a reference plane and intersects the reference plane, wherein a leading edge of the second document makes contact with the downstream one of the first and second document contact surfaces when the second document is conveyed downstream along the reference plane in the conveying path from a position where the second document is in contact with an upstream one of the first and second document contact surfaces, and wherein the reference plane extends along the same plane as an upstream one of the first and second document contact surfaces.

\* \* \* \* \*